Figure 3:
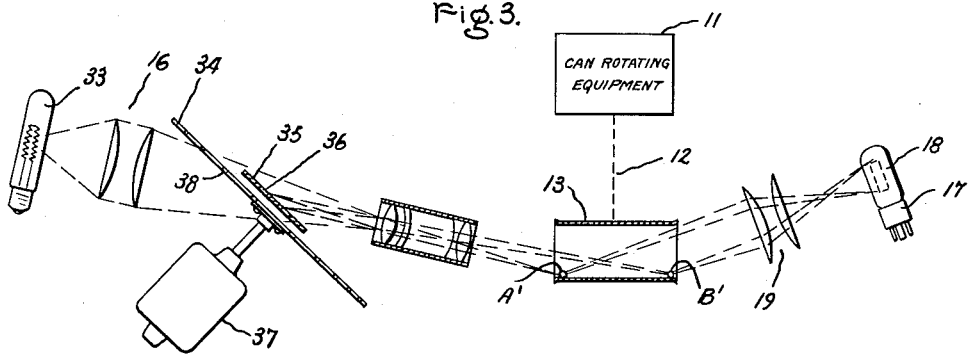

June 12, 1956  H. R. SUMMERHAYES, JR., ET AL  2,750,519
AUTOMATIC CONTAINER INSPECTION EQUIPMENT
Filed Feb. 11, 1953  2 Sheets-Sheet 1
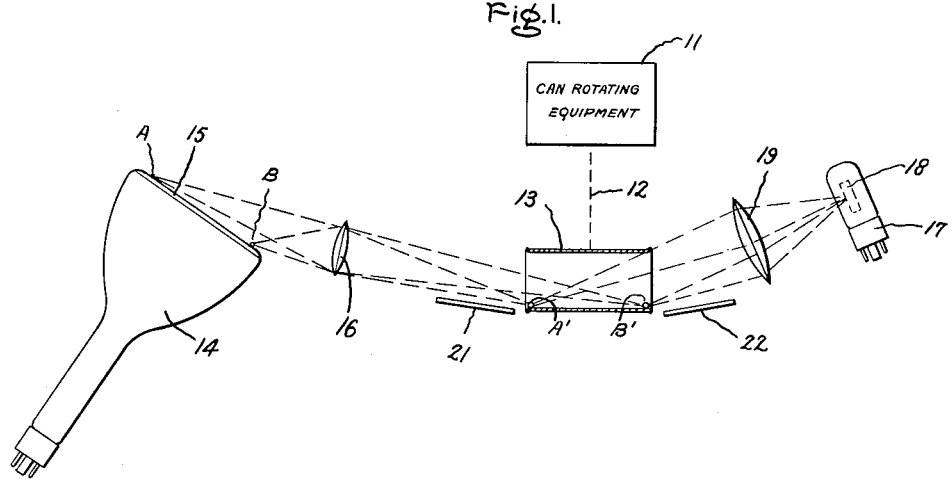
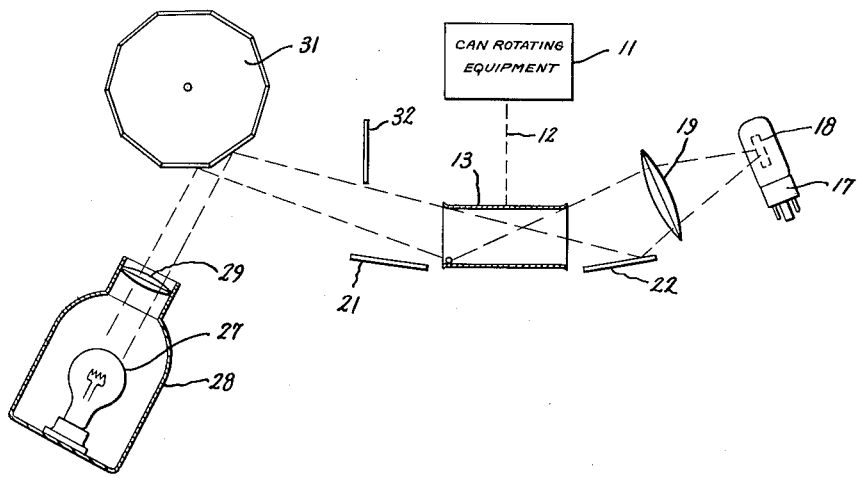
Inventors:
Harry R. Summerhayes, Jr.
Roy E. Anderson,
Ernest S. Sampson,
by Paul A. Frank
Their Attorney.

June 12, 1956  H. R. SUMMERHAYES, JR., ET AL  2,750,519
AUTOMATIC CONTAINER INSPECTION EQUIPMENT
Filed Feb. 11, 1953  2 Sheets-Sheet 2

Inventors:
Harry R. Summerhayes, Jr.
Roy E. Anderson,
Ernest S. Sampson,
by Paul A. Frank
Their Attorney.

United States Patent Office 2,750,519
Patented June 12, 1956

2,750,519

AUTOMATIC CONTAINER INSPECTION EQUIPMENT

Harry R. Summerhayes, Jr., Roy E. Anderson, and Ernest S. Sampson, Schenectady, N. Y., assignors to General Electric Company, a corporation of New York Application February 11, 1953, Serial No. 336,368

13 Claims. (Cl. 250—214)

The present invention relates to automatic container inspection equipment.

More specifically, the invention relates to automatically operating inspection equipment for rapidly inspecting the interior surfaces of open-ended containers.

In the manufacture of containers for foodstuffs, liquids for human consumption, and so forth, it is highly desirable that the container have no defects in its construction which could adversely affect the contents. For this reason, it is necessary to carefully inspect each container at some stage of the manufacture thereof in order to assure that no defective containers are passed along to consumers. Heretofore, such inspection has been accomplished manually, and has not been entirely satisfactory due to the fact that it slows up manfacture of the containers, increases the cost of the containers, and is not entirely reliable. To overcome the above-listed objections to the known methods of container inspection, an automatic container inspection apparatus was needed, and to meet this need, the present invention was developed.

It is, therefore, one object of the present invention to provide a fully automatic inspection equipment for open-ended containers that can be readily incorporated into existing container manufacturing facilities.

Another object of the invention is to provide automatic container inspection equipment which is capable of achieving rapid point by point inspection of the interior surfaces of open-ended containers, and which is reliable in operation.

Still a further object of the invention is to provide equipment of the above type which develops a rejection signal upon the occurrence of relatively small defects in the container being inspected, which signal can be used to actuate a reject mechanism incorporated into the container manufacturing facilities for eliminating the faulty container from the manufacturing process.

In practicing the invention, an inspection apparatus is provided for inspecting the interior surface of open-ended containers and comprises a means for rotating an open-ended container about the axis thereof extending through both the open ends of the container. A radiant energy transmitting assembly is located adjacent the container rotating means, and is adapted to project radiant energy through one of the open ends of a container under inspection so as to irradiate the interior surface of such a container. A scanning means is also located adjacent the container rotating means for effecting point by point examination of the interior surface of a container being inspected along the length of such container in a direction transverse to the direction of rotation, such inspection being carried out with the assistance of the radiant energy produced by the radiant energy transmitting assembly. A transducing means is disposed adjacent the container rotating means in a location such that it is adjacent the remaining opposite open end of a container under inspection, and is responsive to the action of the scanning means so as to convert the intelligence contained in the radiant energy specularly reflected from the interior surface of a container under inspection into an electric signal indicative of the condition of the surface.

Figure 4:
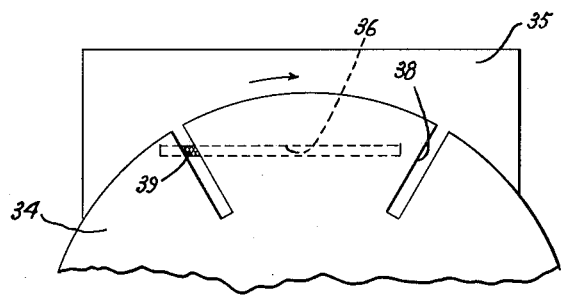

Other objects, features, and many of the attendant advantages of this invention will be more readily appreciated as the same becomes better understood by reference to the following detailed description, when considered in connection with the accompanying drawings, wherein: Fig. 1 is a schematic diagram illustrating one form of an automatic inspection equipment constructed in accordance with the invention; Fig. 2 is a schematic diagram of a second form of an automatic inspection equipment made available by reason of the invention; Fig. 3 illustrates still another and preferred form of an automatic inspection equipment; Fig. 4 is partial plan view of a mechanical scanning apparatus comprising a part of the inspection equipment shown in Fig. 3; and Fig. 5 is a functional block diagram of a detecting circuit suitable for use with any one of the three specific embodiments of the invention disclosed in Figs. 1 through 3.

The embodiment of the invention shown diagrammatically in Fig. 1 of the drawings includes a container handling and rotating equipment indicated at 11 for automatically bringing an open-ended container 13 into an inspection zone, and rotating the container about the axis thereof passing through both open ends of the container. The container rotating portion of the equipment may have a construction similar to the container rotating equipments described in any one of U. S. Patents 1,901,360, 2,403,662, or 2,354,628, or any other known apparatus for turning open-ended containers about the axis thereof, and is designed to rotate the open-ended container 13 in the inspection zone in a manner such that a light transmitting assembly can direct light rays produced thereby into one of the open ends of the container against the interior surface thereof. The light transmitting assembly of the embodiment of the invention shown in Fig. 1 comprises a cathode ray tube 14 which acts as a flying spot scanner in that it has a fluorescent coated face 15 against which a beam of electrons is directed to produce a spot of light. The spot of light produced on the face 15 of cathode ray tube 14 serves as a source of light rays which are collected by a projection lens assembly, indicated at 16, and directed thereby into one of the open ends of a container 13 being inspected. In order to cause the ray of light thus produced to scan lengthwise over the container 13 being inspected, a scanning means is provided which in the present embodiment of the invention may comprise one set of the deflection electrodes of the cathode ray tube 14. By applying a substantially sawtooth wave form excitation voltage to the appropriate pair of deflection electrodes of the cathode ray tube 14, the spot of light produced on the face 15 of the tube by the electron beam induced in the cathode ray tube can be caused to linearly scan across the face of the tube. This action results in causing the light beam directed against the interior surface of the container 13 under inspection by the lens assembly 16 to scan linearly along the length of the container in a direction transverse to the direction of rotation thereof. By correlating the speed of this scanning action with the speed of rotation of the container, the light beam can be caused to substantially effect a point by point examination of the entire interior surface of the container. A transducing means which comprises an electron-optics transducing photocell 17 having a light sensitive electrode 18 is disposed adjacent the remaining opposite end of the container 13 under inspection, and the light beam that is specularly reflected from the interior surface of the container 13 is directed against electrode 18 by a condensing lens assembly 19 disposed intermediate the container and the photocell 17. As additional features, a pair of over-scanning mirrors 21 and 22 may be provided at each of the open ends of the container inspection zone to provide a means for developing definite input and output signals for indicating the beginning and end of the container surface.

In operation, the container 13 to be inspected (preferably a cylindrical open-ended container) is inserted in the inspection zone automatically by handling equipment (not shown) which does not comprise a part of the present invention, but which is well known in the art. Upon coming into the inspection zone, the container is rotated by the container rotating equipment 11. Simultaneously with this action, the scanning signal applied to the deflection electrodes with the cathode ray tube 14 causes the spot of light produced on the fluorescent face 15 of cathode ray tube 14 to trace a linear path from the point A on the face of the tube to the point B. The spot light is located in relation to the lens assembly 16, and the inspection zone in which container 13 is rotated, in a manner such that a pencil-like light beam is produced which is caused to linearly trace a path along the length of the container under inspection from the point A' to the point B' so as to effectively inspect point by point the surface of the can intermediate the identification stations mentioned. By properly correlating the rate of scanning action of the light beam with the speed of rotation of the container under inspection, the light beam can be caused to effectively examine point by point the entire inner surface of the container. Because of the angle at which the inspection light beam impinges upon the surface of the container 13, it is specularly reflected through the collecting lens assembly 19 to the light sensitive electrode 18 of the photocell 17, and results in the production of an electric signal in the photocell 17 which is indicative of the condition of the surface of the container 13.

Figure 5:
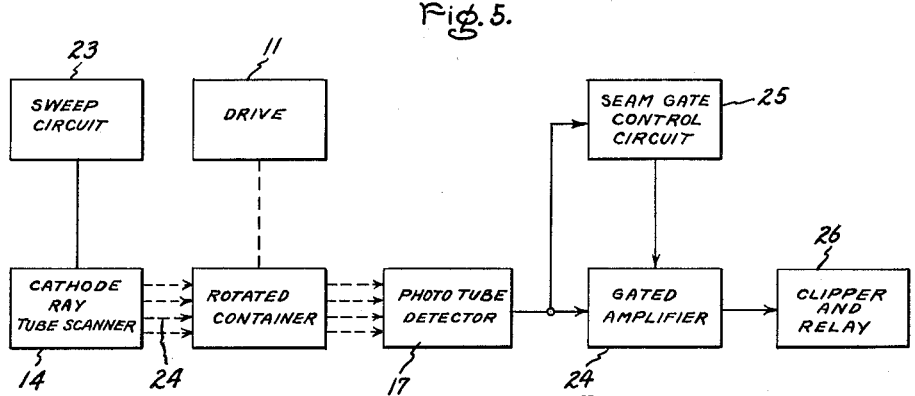

A satisfactory detecting circuit for use with the inspection system illustrated in Fig. 1 of the drawings, is shown in Fig. 5. The detecting circuit may include a sweep circuit 23 having the output thereof connected to a cathode ray tube 14, and comprises a sawtooth wave generator of standard construction. Light rays illustrated in Fig. 5 by dotted lines 24 are produced by cathode ray tube scanner 14 and directed to the container under inspection from which they are reflected to phototube detector circuit 17. Phototube detector circuit 17 has the output thereof connected in parallel to the input of a gated amplifier circuit 24 and to the input of a seam gate control circuit 25. The output of the gated amplifier 24 is controlled from the output of the seam gate control circuit 25, and in turn is connected to the input of a clipper and relay circuit 26. Insofar as the operation of the cathode ray tube scanner and phototube detector circuit 17 is concerned, its operation is precisely the same as the operation of the equipment illustrated in Fig. 1 of the drawings, but with regard to the output signal produced by phototube detector 17, this signal is applied to the input of both the seam gate control circuit 25 and the gated amplifier 24. The seam gate control circuit 25 serves to derive a control signal from the output signal of phototube 17 which gates the amplifier 24 on and off or else changes the sensitivity of the alarm circuit in accordance with the occurrence of a seam in the open-ended container under inspection. Such seams are common to almost all containers for the reason that containers with which the equipment is designed to be used are made from flat sheets of material which are formed into cylindrical shape with the ends joined together to make a seam. In order that this seam not appear in the output circuit as a defect, it is necessary that the output circuit be gated on and off upon the occurrence of the seam, or that the sensitivity be reduced during seam inspection to prevent the normal irregularities present on the seam from causing false rejection. Hence, by reason of the action of the seam gate control circuit 25, the amplifier 24 is gated off upon a seam being rotated into the inspection zone, and is gated on upon the seam passing through and out of the inspection zone. Upon the amplifier 24 being gated on, the output of phototube detector 17 is connected to clipper and relay circuit 26 so as to actuate a relay that operates a reject mechanism upon the occurrence of a defect. One method of seam detection which would be satisfactory for use with the above-described circuit would be to rotate the container 13 under inspection at approximately double the speed necessary to achieve effective scanning, and to gate the amplifier 24 on upon the seam coming into the inspection zone and passing through it, completing one rotation, and gate the amplifier 24 off upon the seam again coming into the inspection zone. Hence there would be one entire revolution of the container under inspection during which time the clipper and relay circuit 26 would be effectively connected to the output of phototube detector circuits 17. Other methods of sensing and detecting the occurrence of the seam and utilizing signal control the effectiveness of the output of phototube detector 17 could be utilized equally as well. It can, therefore, be appreciated from the above discussion that the invention provides a fully automatic inspection equipment for open ended containers which can be readily incorporated into existing container manufacturing facilities, and which provides a rapid point by point inspection of the interior surface of such open-ended containers. The equipment is capable of detecting relatively small defects occurring in the containers under inspection, and is entirely reliable in operation. Because it can be incorporated into existing container making facilities, it is adapted to develop a reject signal upon the occurrence of a defect in the container under inspection, which signal can be used to actuate a reject mechanism for eliminating the faulty containers detected.

A second form of an automatic container inspection equipment constructed in accordance with the invention, is shown in Fig. 2 of the drawings, and includes many elements which are common to the system illustrated in Fig. 1. In particular, the embodiment of the invention shown in Fig. 2 includes a container rotating mechanism 11 adapted to a container 13 to be inspected in an illuminated inspection zone. The inspection zone for container 13 is illuminated from a light source 27 which is disposed within a hood 28 having an observation port therein in which a collecting lens 29 is positioned. The lens assembly 29 serves to direct to the rays of light from light source 27 against a multiface rotating scanning mirror 31 which is connected to a motor (not shown) that serves to rotate the mirror so as to bring different ones of the multifaces thereof into the zone illuminated by light directed thereagainst from the collecting lens 29. Light impinging on the faces of the mirror 31 is reflected into the inspection zone in which the container 13 is rotated, and by reason of the different angular positioning of the multifaces of the mirror, the light beam is sequentially reflected from one mirror at a time into the can and is thereby caused to scan in a direction transverse to the direction of rotation of the container throughout the length of the container 13. The scanning light beam thus developed is caused to impinge upon the interior surface of the container at an angle such that it is specularly reflected from the inner surface of the container and passes through a collecting lens 19 from whence it is directed to the light sensitive surface 18 of a photomultiplier tube 17 disposed adjacent the opposite remaining open end of the container. For purposes of convenience, a pair of over-scanning mirrors 21 and 22 may be provided at each end of the inspection zone in which the container is rotated for the purpose of producing on-off signals at the beginning and end of each lengthwise scan, and a stop 32 may be included for the purpose of limiting the amount of ambient light in the area of the inspection zone.

The operation of the system shown in Fig. 2 is entirely similar to that of the system described in its relation to Fig. 1, in that light rays from the source 27 are collected by lens 29 and directed against the multiface mirror 31 which serves to cause the light beam thus formed to be scanned along the length of the container 13 in a direction transverse to the direction of rotation thereof, and thereby effect a point by point examination of the interior surface. This beam is specularly reflected from the inner surface of the container, and impinges upon the light sensitive electrode 18 of photocell tube 17 so that an electric signal produced by the photocell tube 17 which is indicative of the condition of the surface of the container under inspection. Hence, it can be appreciated that the system of Fig. 2 is in many respects similar in construction to the form of the invention shown in Fig. 1, and includes substantially all of the advantages of the system described with relation to Fig. 1. In addition, the form of the invention shown in Fig. 2 is somewhat cheaper to construct in that it does not require a relatively expensive cathode ray tube to effect a scanning action.

Still a third embodiment of a container inspection equipment constructed in accordance with the invention, is illustrated in Fig. 3 of the drawings. The inspection equipment shown in Fig. 3 is a preferred construction of the invention, and includes a container rotating equipment 11 that is adapted to rotate a container 13 within an inspection zone. The inspection zone is established by a light transmitting assembly which includes a source of light 33 and a collecting lens assembly 16 disposed adjacent thereto which collects the rays of light from source 33, and directs the same towards the container 13 to thereby establish the inspection zone. Positioned intermediate the container to be inspected and the collection lens assembly 16, is a scanning means which comprises a motor driven rotating disk scanner 34 that cooperates with a plate 35 having a slit aperture 36 therein to produce a scanning pencil-like beam of light that is caused to move back and forth over the inspection zone in which the container 13 is established from the point A' to the point B'. This scanning action is caused by the rotating disk scanner plate 34 which has a plurality of radial slots 38, best seen in Fig. 4 of the drawing, but in the periphery thereof. Upon the disk 34 being rotated in a clockwise direction as indicated by the arrow, the radial slots 38 coact with the slit aperture 36 in stationary plate 35 to cut out a pencil-like beam of light (indicated in the cross hatched area 39) that is allowed to pass through the scanner to the inspection zone in which the container to be examined is rotated. From an examination of Fig. 4 of the drawings, it can be appreciated that as the radial slit 39 moves in a counterclockwise direction a pencil-like beam of light is caused to linearly move along the length of the slit aperture 36 in plate 35, and results in causing the pencil-like beam of light transmitted through the scanner assembly to be scanned from the point A' on the container under inspection transverse to the direction of rotation of the container to the point B'. The next succeeding radial slot 38 in the disk then causes the beam to again appear at point A' and to be scanned along the length of the container to the point B' to thereby effectively scan point by point the entire inner surface of the container. Scanning beam of light thus produced is caused to be specularly reflected from the inner surface of the container 13 being examined and to pass through a collecting lens assembly 19 to the light sensitive surface 18 of a photocell transducing device 17. The photocell transducing device 17 converts the light thus specularly reflected thereto to an electric signal indicative of the reflective qualities of the surface of the container, and hence indicative of the condition of the surface. In order to utilize the electrical signals produced by photocell transducing device 17, a detecting circuit such as is illustrated in Fig. 2 of the drawings, may be provided. As the operation of the detecting circuit when used with the arrangement illustrated in Fig. 3 of the drawing is entirely similar to the operation thereof when used with the system illustrated in Fig. 1, a further description of the operation of that portion of the equipment is believed to be unnecessary. With an inspection equipment constructed in the manner illustrated in Fig. 3, substantially all of the advantages of the equipment described in connection with Fig. 1 are obtained, and in addition a further advantage is derived in that the mechanical scanning system used in the equipment shown in Fig. 4 is considerably cheaper to build and construct than the cathode ray tube flying spot scanner used in the arrangement shown in Fig. 1, or the multiface mirror used in the arrangement shown in Fig. 2.

From the foregoing description, it can be readily appreciated that the invention provides a fully automatic inspection equipment for open-ended containers, which equipment can be readily incorporated into existing container manufacturing facilities. The equipment provides a rapid point by point inspection of the interior surface of open-ended containers, and is entirely reliable in operation. It is capable of detecting relatively small defects occurring in the surface of such containers, and develops a reject signal which can be used to actuate reject mechanisms designed to be incorporated in the manufacturing equipment of such containers so as to eliminate faulty containers from the manufacturing process.

Other modifications and variations of the present invention will be suggested to those skilled in the art in the light of the above teachings. It is, therefore, to be understood that changes may be made herein which are within the full intended scope of the invention as defined by the appended claims.

What we claim as new and desire to secure by Letters Patent of the United States is:

1. Inspection apparatus for inspecting the interior surface of open-ended containers comprising means for rotating an open-ended container about the axis thereof extending through both of the open ends, a radiant energy transmitting assembly located adjacent said container rotating means and adapted to project radiant energy through one of the open ends of a container being inspected against the interior surface of such container, scanning means located adjacent the container rotating means for effecting point by point examination of the interior surface of a container being inspected along the length of such container in a direction transverse to the direction of rotation thereof with the radiant energy produced by said radiant energy transmitting assembly, and transducing means disposed adjacent the container rotating means in a location such that it is adjacent the remaining opposite open end of a container being inspected, and is responsive to the action of said scanning means for converting the intelligence contained in the radiant energy specularly reflected from the interior surface of a container under inspection into an electric signal indicative of the condition of the surface.

2. Inspection apparatus for inspecting the interior surface of open-ended containers comprising means for rotating an open-ended container about the axis thereof extending through both of the open ends, a light transmitting assembly positioned adjacent one of the open ends of the container for projecting light into the container against the interior surface thereof, scanning means located adjacent the container for effecting point by point examination of the interior surface of the container along the length of the container in a direction transverse to the direction of rotation thereof with the assistance of the light produced by said light transmitting assembly, and transducing means positioned adjacent the opposite open end of said container and responsive to the action of said scanning means for converting the intelligence contained in the light specularly reflected from the interior surface of the container into an electric signal indicative of the condition of the surface.

3. Inspection apparatus for inspecting the interior surface of open-ended containers comprising means for rotating an open-ended container about the axis thereof extending through both of the open ends, a radiant energy transmitting assembly positioned adjacent said container rotating means and adapted to project radiant energy through one of the open ends of a container being inspected against the interior surface of such container, scanning means located intermediate the container rotating means and said light transmitting assembly for forming the light rays from said assembly into a scanning beam of light for effecting point by point examination of the interior surface of a container being inspected along the length of such container in a direction transverse to the direction of rotation thereof, and transducing means disposed adjacent the container rotating means in a location such that it is adjacent the remaining opposite open end of a container being inspected and is responsive to the action of said scanning means for converting the intelligence contained in the radiant energy specularly reflected from the interior surface of a container under inspection into an electric signal indicative of the condition of the surface.

4. Inspection apparatus for inspecting the interior surface of open-ended containers comprising means for rotating an open-ended container about the axis thereof extending through both of the open ends, a light transmitting assembly positioned adjacent one of the open ends of the container for projecting light into the container against the interior surface thereof, scanning means located intermediate said light transmitting assembly and the container for forming the light rays from said assembly into a scanning beam of light for effecting point by point examination of the interior surface of the container along the length of the container in a direction transverse to the direction of rotation thereof, and transducing means positioned adjacent the remaining open end of said container and responsive to the action of said scanning means for converting the intelligence contained in the light specularly reflected from the interior surface of the container into an electric signal indicative of the condition of the surface.

5. Inspection apparatus for inspecting the interior surface of open-ended containers comprising means for rotating an open-ended container about the axis thereof extending through both of the open ends, a source of radiant energy positioned adjacent one of the open ends of the container, means positioned intermediate said radiant energy source and said container rotating means for collecting and projecting radiant energy from the source into a container under inspection against the interior surface thereof, scanning means located adjacent the container rotating means for effecting a point by point examination of the interior surface of a container being examined along the length of the container in a direction transverse to the direction of rotation thereof with the assistance of the radiant energy produced by said radiant energy source, and an electron radiant energy transducing device positioned adjacent the container rotating means in a location such that it is adjacent the remaining opposite open end of a container under inspection and is responsive to the action of said scanning means for converting the intelligence container in the radiant energy specularly reflected from the interior surface of a container under inspection into an electric signal indicative of the condition of the surface.

6. Inspection apparatus for inspecting the interior surface of open-ended containers comprising means for rotating an open-ended container about the axis thereof extending through both the open ends, a light source positioned adjacent one of the open ends of the container, collecting and projection lens assemblies positioned intermediate said light source and said container for collecting and projecting light from the source into the container against the interior surface thereof, scanning means located adjacent the container for effecting point by point examination of the interior surface of the container along the length of the container in a direction transverse to the direction of rotation thereof with the assistance of the light produced by said light transmitting assembly, and an electron-optics transducing device positioned adjacent the remaining open end of said container and responsive to the action of said scanning means for converting the intelligence contained in the light specularly reflected from the interior surface of the container into an electric signal indicative of the condition of the surface.

7. Inspection apparatus for inspecting the interior surface of open-ended cylindrical containers comprising means for rotating an open-ended container about the axis thereof extending through both of the open ends, a light source positioned adjacent one of the open ends of the container, a lens assembly positioned intermediate said light source and said container for collecting and projecting light from the source into the container against the interior surface thereof, scanning means located intermediate the light source and said lens assembly for forming the light rays from the assembly into a scanning beam of light for effecting point-by-point examination of the interior surface of the container along the length of the container in a direction transverse to the direction of rotation thereof, said lengthwise scanning occurring at a comparatively rapid rate with relation to the speed of rotation of the container, and an electron optics transducing device positioned adjacent the remaining open end of said container and responsive to the action of said scanning means for converting the intelligence contained in the scanning light beam specularly reflected from the interior surface of the container into an electric signal indicative of the condition of the surface.

8. Apparatus for inspecting the interior surface of open-ended containers comprising means for rotating an open-ended container about an axis thereof extending through both of the open ends, radiant energy transmitting means located and arranged to project radiant energy through one of the open ends of and against the interior surface of a container being inspected, means utilizing such radiant energy to effect a point-by-point scanning examination of the interior surface of the container along a length thereof parallel to said axis, and transducing means utilizing radiant energy specularly reflected from the interior surface of and emanating from the other open end of a container being inspected for producing a signal indicative of the condition of the surface.

9. Inspection apparatus for inspecting the interior surface of open-ended containers comprising means for rotating an open-ended container about the axis thereof extending through both of the open ends, a radiant energy transmitting assembly located adjacent said container rotating means and adapted to project radiant energy through one of the open ends of a container being inspected against the interior surface of such container, scanning means located adjacent the container rotating means for effecting point by point examination of the interior surface of a container being inspected along the length of such container in a direction transverse to the direction of rotation thereof with the radiant energy produced by said radiant energy transmitting assembly, transducing means disposed adjacent the container rotating means in a location such that it is adjacent the remaining opposite open end of a container being inspected, and is responsive to the action of said scanning means for converting the intelligence contained in the radiant energy specularly reflected from the interior surface of a container under inspection into an electric signal indicative of the condition of the surface, and a detecting circuit coupled to the output of said transducing means and comprising a gating circuit having two inputs with one input thereof being coupled to the output of said transducing means, a seam sensing circuit having the input thereof coupled to the output of said transducing means and the output thereof coupled to the remaining input of said gating circuit for controlling the same, and a utilization device controlled by said gating circuit.

10. Inspection apparatus for inspecting the interior surface of open-ended containers comprising means for rotating an open-ended container about the axis thereof extending through both of the open ends, a light transmitting assembly positioned adjacent one of the open ends of the container for projecting light into the container against the interior surface thereof, scanning means located adjacent the container for effecting point by point examination of the interior surface of the container along the length of the container in a direction transverse to the direction of rotation thereof with the assistance of the light produced by said light transmitting assembly, transducing means positioned adjacent the opposite open end of said container and responsive to the action of said scanning means for converting the intelligence contained in the light specularly reflected from the interior surface of the container into an electric signal indicative of the condition of the surface, and a detecting circuit coupled to the output of said transducing means and comprising a gating circuit having two inputs with one input thereof being coupled to the output of said transducing means, a seam sensing circuit having the input thereof coupled to the output of said transducing means and the output thereof coupled to the remaining input of said gating circuit for controlling the same, and a utilization device controlled by said gating circuit.

11. Inspection apparatus for inspecting the interior surface of open-ended containers comprising means for rotating an open-ended container about the axis thereof extending through both of the open ends, a light transmitting assembly positioned adjacent one of the open ends of the container for projecting light into the container against the interior surface thereof, scanning means located intermediate said light transmitting assembly and the container for forming the light rays from said assembly into a scanning beam of light for effecting point by point examination of the interior surface of the container along the length of the container in a direction transverse to the direction of rotation thereof, transducing means positioned adjacent the remaining open end of said container and responsive to the action of said scanning means for converting the intelligence contained in the light specularly reflected from the interior surface of the container into an electric signal indicative of the condition of the surface, and a detecting circuit coupled to the output of said transducing means and comprising a gating circuit having two inputs with one input thereof being coupled to the output of said transducing means, a seam sensing circuit having the input thereof coupled to the output of said transducing means and the output thereof coupled to the remaining input of said gating circuit for controlling the same, and a utilization device controlled by said gating circuit.

12. Inspection apparatus for inspecting the interior surface of open-ended containers comprising means for rotating an open-ended container about the axis thereof extending through both the open ends, a light source positioned adjacent one of the open ends of the container, collecting and projection lens assemblies positioned intermediate said light source and said container for collecting and projecting light from the source into the container against the interior surface thereof, scanning means located adjacent the container for effecting point by point examination of the interior surface of the container along the length of the container in a direction transverse to the direction of rotation thereof with the assistance of the light produced by said light transmitting assembly, an electron-optics transducing device positioned adjacent the remaining open end of said container and responsive to the action of said scanning means for converting the intelligence contained in the light specularly reflected from the interior surface of the container into an electric signal indicative of the condition of the surface, and a detecting circuit coupled to the output of said electron optics transducing device and comprising a gating circuit having two inputs with one input thereof being coupled to the output of said electron-optics transducing device, a seam sensing circuit having the input thereof coupled to the output of said electron optics transducing device and the output thereof coupled to the remaining input of said gating circuit for controlling the same, and a utilization device controlled by said gating circuit.

13. Apparatus for inspecting the interior surface of open-ended containers comprising means for rotating an open-ended container about an axis thereof extending through both of the open ends, radiant energy transmitting means located and arranged to project radiant energy through one of the open ends and against the interior surface of a container being inspected, means utilizing such radiant energy to effect a point by point scanning examination of the interior surface of the container along a length thereof parallel to said axis, transducing means utilizing radiant energy specularly reflected from the interior surface of and emanating from the other open end of a container being inspected for producing a signal indicative of the condition of the surface, and a detecting circuit coupled to the output of said transducing means and comprising a gating circuit having two inputs with one input thereof being coupled to the output of said transducing means, a seam sensing circuit having the input thereof coupled to the output of said transducing means and the output thereof coupled to the remaining input of said gating circuit for controlling the same, and a utilization device controlled by said gating circuit.

References Cited in the file of this patent

UNITED STATES PATENTS

| | | |
|---|---|---|
| 2,246,501 | Bradner et al. | June 24, 1941 |
| 2,248,985 | Gray | July 15, 1941 |
| 2,287,322 | Nelson | June 23, 1942 |
| 2,313,218 | Brace et al. | Mar. 9, 1943 |
| 2,481,863 | Owens | Sept. 13, 1949 |
| 2,593,127 | Fedorchak | Apr. 15, 1952 |
| 2,649,500 | Fedorchak | Aug. 18, 1953 |